United States Patent [19]

Lund

[11] Patent Number: 4,501,943
[45] Date of Patent: Feb. 26, 1985

[54] APPARATUS AND METHOD FOR FUSING BATTERY TERMINALS WITH IMPROVED INDUCTION HEATING POWER CONTROL

[75] Inventor: David L. Lund, Minneapolis, Minn.

[73] Assignee: GNB Batteries Inc., Mendota Heights, Minn.

[21] Appl. No.: 533,079

[22] Filed: Sep. 19, 1983

[51] Int. Cl.³ .......................... H05B 6/06; H05B 6/10
[52] U.S. Cl. ............................... 219/10.43; 219/10.57; 219/10.77; 219/10.49 R; 219/10.71; 29/623.1; 29/623.4; 228/901
[58] Field of Search ............... 219/10.77, 10.75, 10.53, 219/10.49 R, 10.43, 10.41, 9.5, 10.71; 29/623.1, 623.2, 623.4; 228/180 R, 901; 164/DIG. 1, 513

[56] References Cited

U.S. PATENT DOCUMENTS

| | | | |
|---|---|---|---|
| 2,400,472. | 5/1946 | Strickland, Jr. | 219/10.75 X |
| 3,271,115 | 9/1966 | Keller | 219/10.43 X |
| 3,287,097 | 11/1966 | Limpel | 219/10.41 X |
| 3,612,805 | 10/1971 | Kennedy | 219/10.77 X |
| 4,050,501 | 9/1977 | Eberle . | |
| 4,191,875 | 3/1980 | Cunningham | 219/10.49 R |

FOREIGN PATENT DOCUMENTS

| | | |
|---|---|---|
| 1201339 | 12/1967 | United Kingdom . |
| 1297371 | 5/1969 | United Kingdom . |
| 1311403 | 8/1971 | United Kingdom . |
| 1362890 | 7/1972 | United Kingdom . |
| 1381250 | 7/1973 | United Kingdom . |
| 1582592 | 4/1977 | United Kingdom . |

Primary Examiner—Philip H. Leung
Attorney, Agent, or Firm—Augustus J. Hipp; Dennis R. Schlemmer

[57] ABSTRACT

An apparatus and method for fusing the ends of battery cell terminal posts and the ends of hollow bushings fixed in the plastic cover of a battery being assembled and within which the terminal posts are concentrically disposed. The apparatus includes a pair of induction heating coils which each concentrically support a mold cavity insert adapted to receive the ends of the terminal posts and bushings to be fused and a ferrite insert adapted to concentrate induced current in the ends of the terminal post and bushings upon energization of the coils. An electrical control is provided for selectively generating a radio-frequency oscillating current in the coils to effect heating, melting, and fusion of the ends of the terminal posts and bushings to consistent fusion depths while the plastic battery case remains substantially uneffected. The control is adapted to substantially instantaneously energize the inductance heating coils to a first power level, maintain such power level for a first predetermined period for melting the ends of the terminal posts and bushings, and then gradually decrease the power level in a substantially uniform controlled manner for a second predetermined period to produce finished fuse terminals with good surface appearance.

12 Claims, 14 Drawing Figures

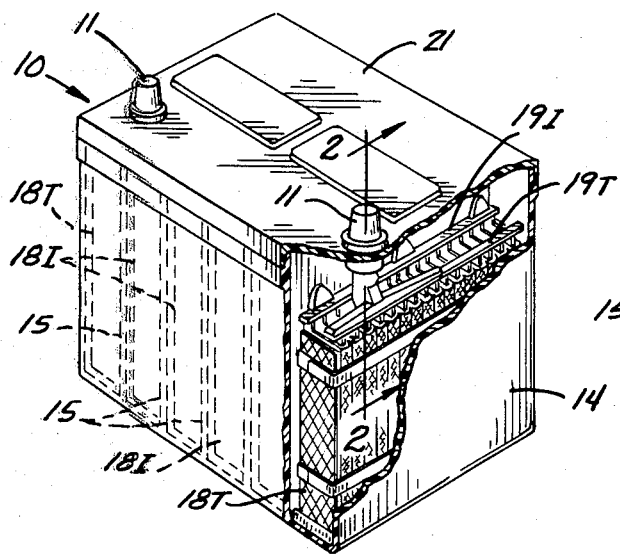
_fig. 1._
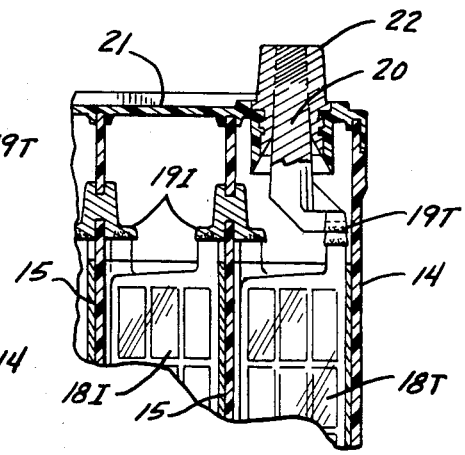
_fig. 2._
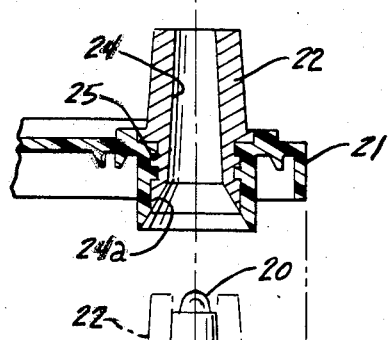
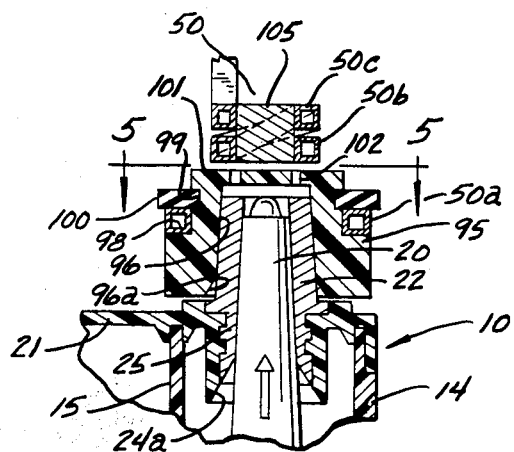
_fig. 4._
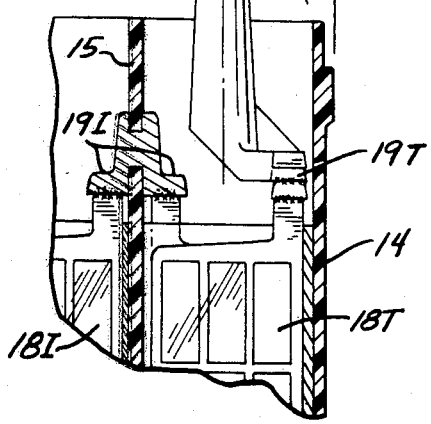
_fig. 3._
_fig. 5._

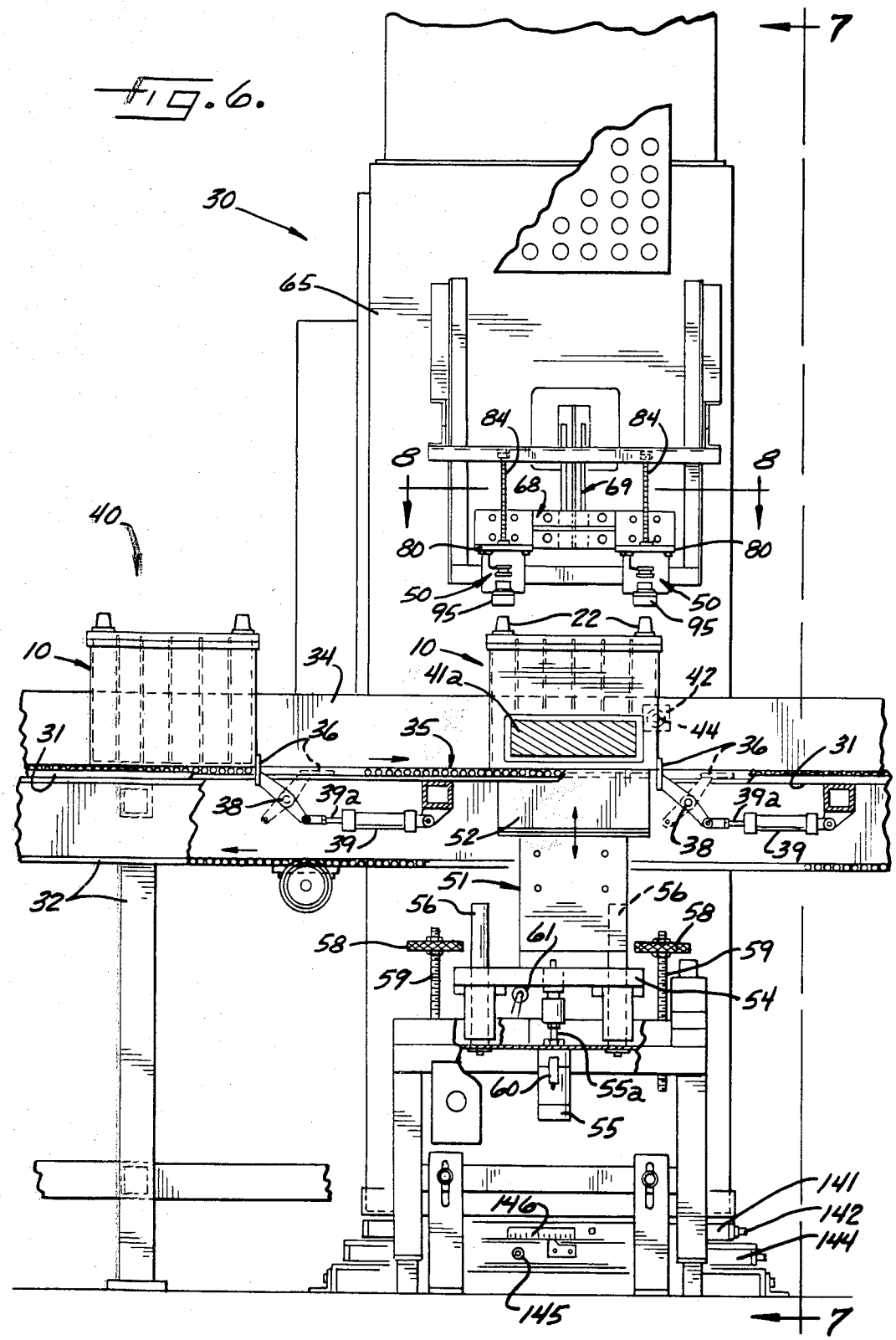

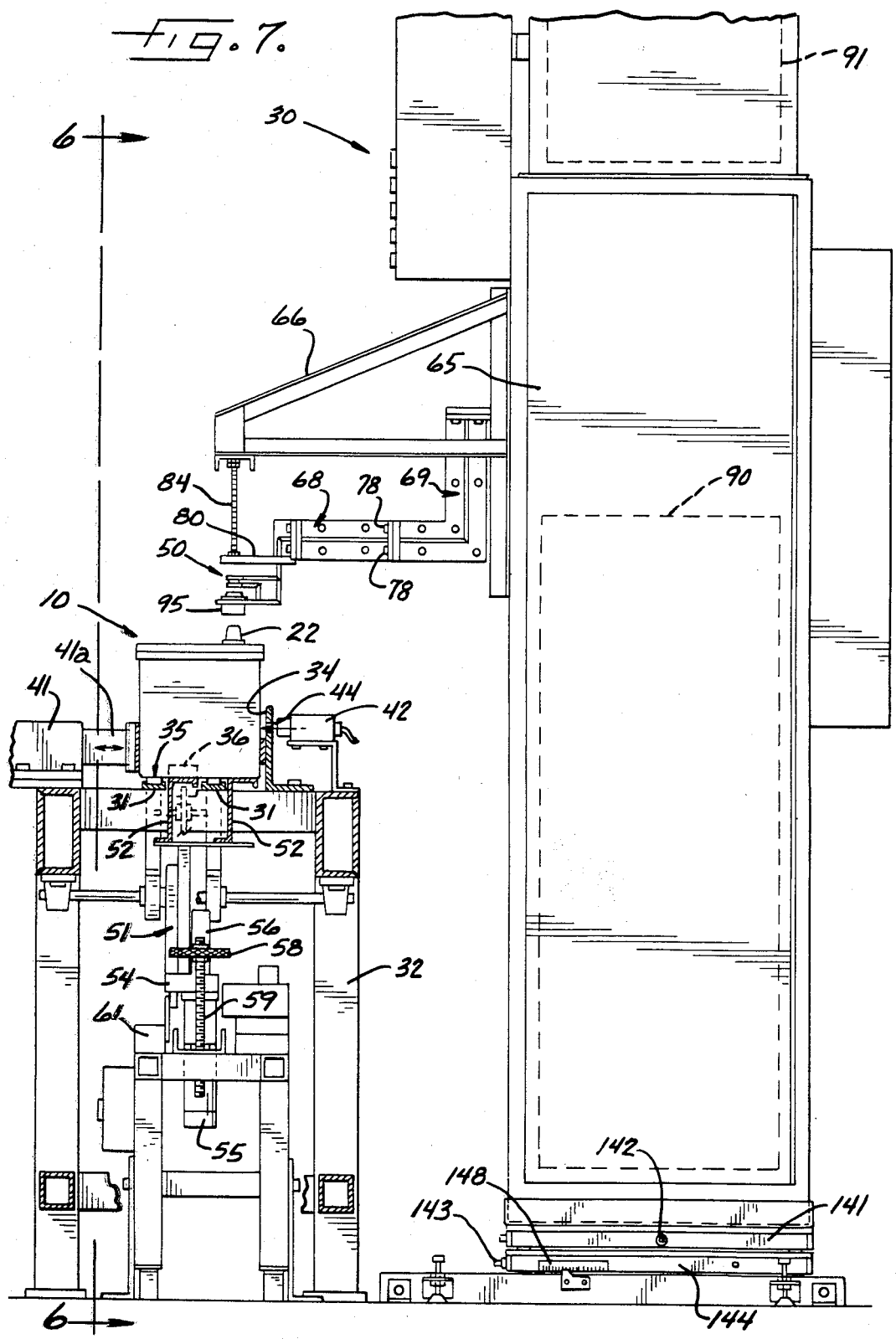

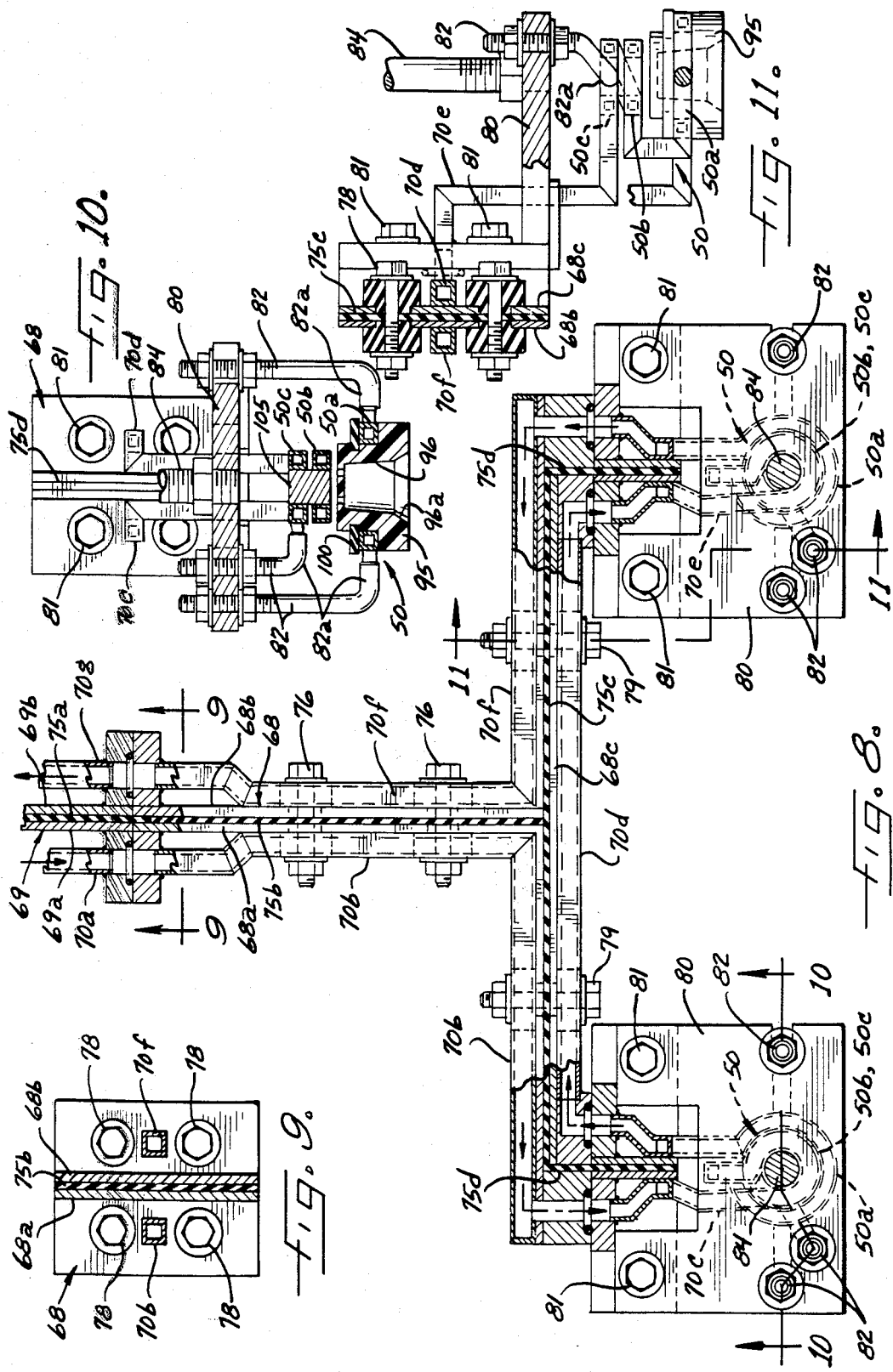

APPARATUS AND METHOD FOR FUSING BATTERY TERMINALS WITH IMPROVED INDUCTION HEATING POWER CONTROL

RELATED APPLICATION

Lund et al., U.S. application Ser. No. 533,080 filed Sept. 19, 1983 for Apparatus and Method for Fusing Battery Terminals.

DESCRIPTION OF THE INVENTION

The present invention relates generally to the manufacture of lead acid storage batteries, and more particularly, to an improved apparatus and method for fusing battery cell terminal posts to respective bushings in the battery casing to form the external terminals of the completed battery.

In the manufacture of lead acid storage batteries, it is customary to assemble the individual battery cells into a case with the terminal cells each having an upstanding lead terminal post located at opposed ends of the battery, to then position a cover having cylindrical lead bushings fixed therein onto the battery case with the terminal posts extending through respective of the bushings, and to then heat, melt, fuse, mold, cool, and freeze the upper ends of the bushings and posts to form the finished battery terminals. Since the case and cover in modern day batteries commonly are made of plastic, care must be taken in fusing the terminal posts and bushings so as not to melt or otherwise damage the immediately adjacent portion of the cover, which can either render the battery defective or sufficiently weaken the seal and support between the cover and bushings as to create a potentially dangerous condition during use of the battery.

Heretofore it has been common practice to fuse the terminal posts and bushings by melting the ends thereof by means of an acetylene torch which is manually held and operated. Not only does such procedure fail to lend itself to use in a fully automated battery production line, but the quality and depth of the fused areas of the terminal posts and bushings vary with the operator who performs the fusion process, and even between terminals of successive batteries fused by the same operator since there is no reliable means for controlling the degree of fusion that is effected. Moreover, it is not easily determinable whether minimum required fusion depths are obtained, i.e., generally considered to be between $\frac{1}{8}$ and 3/16 inch as measured from the top of the finished terminal.

While various proposals have been made for automatically fusing battery terminal posts and cover bushings by means of either acetylene torch heating, electrical resistance heating, or electrical induction heating, such proposals all have faced various drawbacks, including the inability to obtain reliable fusion depths within the requisite processing time, undesirable melting of the cover about the bushings, and unacceptable appearance of the finished terminals. Since lead oxides contained within the lead bushings tend to float to the surface during melting, under some circumstances this has been found to result in unsightly irregularities in the surfaces of the finished battery terminals.

It is an object of the present invention to provide an improved apparatus and method for fusing the terminal posts and casing bushings in forming battery terminals.

Another object is to provide an apparatus as characterized above which permits reliable and effective fusion of the terminal post and bushings in a relatively short time, and thus, is adaptable for use in a fully automated battery production line.

A further object is to provide an apparatus of the foregoing type which permits quick automated fusion of the terminal posts and cover bushings while reliably effecting proper fusion depths of the finished terminals, preventing cover melting or damage, and obtaining completed battery terminals with relatively good surface appearance.

Other objects and advantages of the invention will become apparent upon reading the following detailed description and upon reference to the drawings, in which:

FIG. 1 is a perspective of a completed battery having terminals formed by the apparatus and method of the present invention;

FIG. 2 is an enlarged section of one of the fused terminals of the battery shown in FIG. 1, taken the plane of line 2—2;

FIG. 3 is an exploded vertical section showing a cover being positioned onto a battery case during assembly of the battery;

FIG. 4 is a vertical section showing a battery with the cover assemblied on the case and the battery operatively positioned in the illustrated apparatus, prior to fusing of the terminal post and cover bushing;

FIG. 5 is a horizontal view of the top of the mold insert of the illustrated apparatus, taking in the plane of line 5—5 and FIG. 4;

FIG. 6 is a front elevational view of the illustrated terminal post fusion apparatus, taken in the plane of line 6—6 in FIG. 7;

FIG. 7 is a side elevational view of the illustrated apparatus, taken in the plane of line 7—7 of FIG. 6;

FIG. 8 is an enlarged fragmentary section of the induction heating coils and support of the illustrated apparatus, taken in the plane of line 8—8 in FIG. 6;

FIGS. 9-11 are sections taken in the planes of lines 9—9, 10—10, and 11—11 in FIG. 8 respectively;

Figure 12:
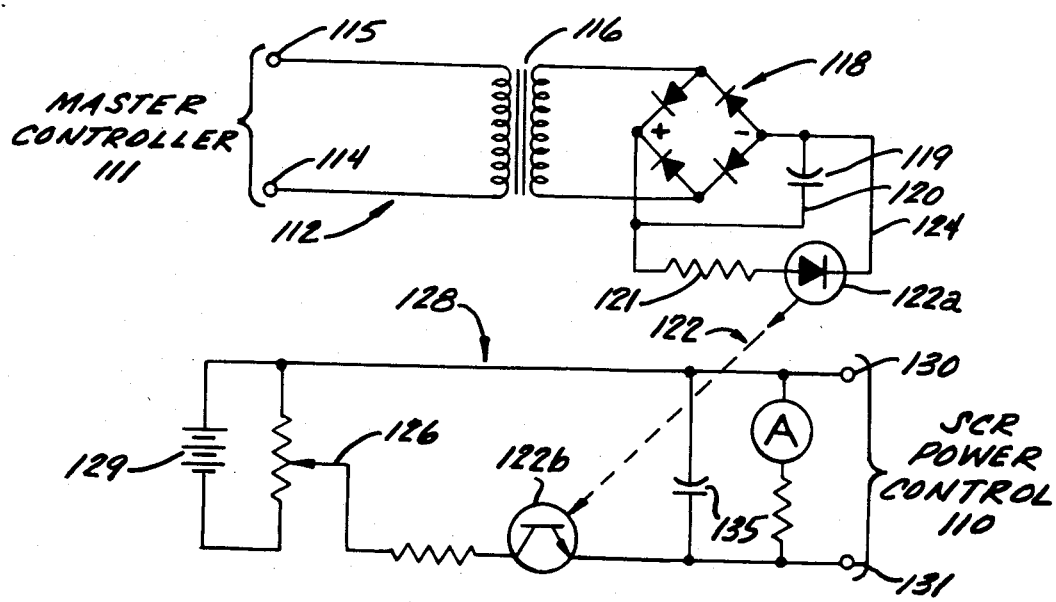
FIG. 12 is a schematic of a down-slope heat control circuit for the induction heating coils of the illustrated apparatus.

While the invention is susceptible to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention. Thus, while the present invention will be described in conjunction with the manufacture of a lead-acid storage battery for starting, lighting and ignition (hereinafter "SLI") applications, it will be appreciated that the invention is equally applicable for other battery applications. Similarly, while the invention will be described in connection with top terminal battery connections, the invention also is applicable to the connection of other battery components, such as side terminals, intercell connectors, and the like. Moreover, it will be understood that the invention is applicable to devices, other than batteries, which have fusible components.

Referring now to FIG. 1, there is shown an illustrative fully assembled and processed SLI battery 10 having terminals 11 formed on the top side thereof by a terminal fusion apparatus in accordance with the present invention. The illustrated battery 10, which is of a type generally similar to that shown in Klang et al. application Ser. No. 352,924 filed Feb. 26, 1982, includes a case 14, preferably made of plastic, formed with a plurality of internal divider partitions 15 that form individual compartments for containing respective battery cell elements 18I or 18T. The illustrated battery 10 includes six cell elements, namely two outermost terminal cell elements 18T at opposed ends of the battery and four intermediate cell elements 18I located therebetween. As is known in the art, the electrode plates of like polarity of each battery cell element 18I, 18T are electrically coupled together by a respective cast lead lug-strap 19I or 19T. The lug-straps 19T for the terminal cell elements 18T are provided with an upstanding terminal post 20 which may be integrally formed with the strap 19T, or alternatively, the post 20 may be separately cast or otherwise mounted on the strap 19T.

During assembly of such batteries, it is customary to assemble the cell elements 18I, 18T in the case 14, either before or after the lug straps 19I, 19T and terminal posts 20 are cast thereon. Prior to closing the top of the battery, the lug straps 19I are suitably joined together through the partitions 15 (as shown in FIG. 3) and a cover 21 with terminal bushings 22 mounted therein is thereafter positioned onto the case 14 with the terminal posts 20 extending co-axially through the bushings 22 (FIG. 4). The bushings 22 have a slight upward external taper, shaped according to industry standards, and a tapered axial opening 24, shaped generally complimentary to the terminal posts 20. The lowermost end of the bushing opening 24 has an outwardly flared chamfer 24a (FIG. 3) for guiding the terminal post 20 into proper seating in the bushing during assembly of the cover 21 onto the case 14. In the illustrated embodiment, the terminal posts 20 are of sufficient height that upon assembly on the cover 21 the tops of the posts 20 are flush with the tops of the bushings 22 (FIG. 4). For reliably supporting the bushings 22 in the cover 21, the bushings 22 each preferably have a ribbed peripheral mounting portion 25 that is adapted to provide a strong mechanical connection with the plastic cover 21 while forming an effective seal about the periphery of the cover and bushing.

Referring now to FIGS. 6 and 7, there is shown a battery terminal fusion apparatus 30 embodying the present invention which has induction heating means adapted for quickly, reliably, and automatically heating, melting, and fusing the ends of the terminal posts and cover bushings to proper and consistent fusion depths with good surface appearance, while not melting or otherwise damaging the plastic battery case and cover. The illustrated apparatus 30 is included in an automated production line having a conveyer track 31 upon which batteries being assembled are moved through successive operating stations. The track 31 is supported on a structural frame 32 and comprises a pair of laterally spaced elongated bottom track members upon which the batteries ride. An upstanding side-reference rail 34 is located immediately adjacent the track, and suitable chain conveyer means, generally indicated at 35, is provided for moving the batteries along the tracks.

For stopping the batteries at predetermined operating stations along the track 31, a plurality of pivotable stops 36 are mounted on the underside of the track. To selectively move the stops from a retracked position, shown in phantom in FIG. 6, to a raised battery stopping position shown in solid lines, the stops 36 each are pivotably mounted on respective pivot shafts 38 and have one end coupled to a rod 39a of a respective air cylinder 39 fixed at its opposite end to the frame 32. Thus, as shown in FIG. 6, batteries may be successively stopped at a ready station 40 for the fusion apparatus 30 with the cover 21 mounted on the case 14 and the terminal posts 20 extending upwardly through the respective cover bushings 22, as previously described. During the next operating cycle of the production line, the cylinders 39 are actuated to retract the stops 36, the batteries are advanced along the track 31 to the succeeding operating stations, and the stops 36 are again raised by reverse actuation of the air cylinders 39, thereby successively moving batteries from the ready station 40 to the terminal fusion apparatus 30 and from the fusion apparatus to the next station. Following advancement of a battery to the terminal fusion apparatus 30, the battery is firmly positioned against the side-reference rail 34 by actuation of a cylinder 41, the rod 41a of which extends into engagement with the side of the battery and moves it into proper position against the rail 34. For sensing the proper position of a battery against the side-reference rail 34, a limited range photosensor 42 is mounted on the opposite side of the rail 34 immediately adjacent an aperture 44 therein and is adapted to sense the presence of a battery only when positioned against the side rail.

The terminal fusion apparatus 30 includes a pair of induction heating coils 50 disposed in an aligned relation to the terminal posts 20 and bushings 22 of a battery properly positioned at the fusion apparatus, and an elevator 51 is provided for effecting relative movement between the battery and coils 50 such that the ends of the battery terminal posts and bushings are positionable in operative relation to the induction heating coils. The elevator 51 is mounted immediately below the track 31 and includes a pair of upstanding legs 52 that can be selectively raised and lowered with respect to the track 31. The elevator 51 is secured on the transverse mounting plate 54 fixed at the upper end of a rod 55a of an air cylinder 55 such that actuation of the cylinder 55 and extension of the rod 55a will lift the elevator causing the legs 52 to be raised above the level of the track, lifting the battery off the track and positioning terminal posts 20 and bushings 22 thereof into the underside inductance heating coils 50. Reverse actuation of the air cylinder 55 lowers the elevator 51 and repositions the battery onto the track 31 for subsequent movement along the production line. To guide such elevator movement, the traverse mounting plate 54 is supported for vertical movement on upstanding guide rods 56 (FIG. 6). In order to permit relatively precise adjustment of the lifting movement of the elevator 51, stops 58 are threadably mounted on upstanding bolts 59 carried by the frame 32. A magnetic switch 60 on the cylinder 55 senses the raised condition on the elevator 51, and a switch 61 senses the lowered condition.

The induction heating coils 50 in this instance are supported in cantilever fashion from the cabinet 65 of the induction generator of the terminal fusion apparatus 30 immediately below a protective hood positioned to prevent inadvertent contact with the coils 50, and are rigidly studded to a coil brace 66. For supporting the coils 50 in longitudinally spaced relation corresponding to the spacing between the battery terminals to be fused, the coils are carried by a T-buss 68 which in turn is supported at a desired elevation by a dropper buss 69 fixed to the induction output plates on the cabinet 65 of the induction generator (FIGS. 7 and 8). The coils 50 preferably each comprise a continuous length of copper tubing formed in a helix configuration of concentric circular turns 50a, 50b, 50c (FIGS. 4 and 10), and the coils 50 are interconnected to form part of a continuous inductance heating and cooling circuit 70a–70g (FIG. 8). Such copper tubing circuit in this instance includes an inlet section 70a communicating from the cabinet 65 and supported by the dropper buss 69, a T-buss section 70b communicating with the inlet section 70a and supported by the T-buss 68, a section 70c communicating with the T-buss section 70b and forming one of the coils 50, a section 70d communicating between the section 70c and a section 70e forming the other coil 50, a T-buss section 70f communicating with the section 70e and supported on an opposite side of the T-buss 68 as the section 70b, and an outlet section 70g communicating between the T-buss section 70f and the cabinet 65 and supported by the dropper buss 69 on the side opposite the section 70b.

The illustrated dropper buss 69 comprises a pair of copper plates 69a, 69b separated by an insulating spacer 75a and fixed to the outside of the cabinet 65. The T-buss 68 comprises a pair of L-shaped copper plates 68a, 68b separated by an insulating spacer 75b coupled together by bolts 76 (FIG. 8), and mounted in an outwardly extended relation to the dropper buss 69 by bolts 78 (FIG. 9). The T-buss 68 further includes a forward plate 68c secured forwardly of the L-shaped plates 68a, 68b by bolts 79 and separated therefrom by an insulating spacer 75c. Forwardly extending insulator spacers 75d separate inlet and outlet legs of each coil 50. The coils 50 in this case each are supported by an angle flange 80 secured to the T-buss 68 by bolts 81 (FIG. 11). The coils 50 are suspended from an outwardly extending horizontal flange of each angle flange 80 by depending studs 82 having inwardly angled ends 82a fixed to the coil turns. To provide further rigidity to the cantilever coil support, bolts 84 in this case are connected between the underside of the coil brace 66 and the angle flanges 80 (FIGS. 6 and 7). It will be understood that suitable seals and insulating means will be provided between the various buss plates and copper tubing couplings so as to form a continuous low-resistance electrical and leak-free fluid circuit through the copper tubing sections 70a–70g.

The input and output sections 70a and 70g of the copper tubing can thereby be electrically coupled to a high voltage, radio-frequency generator 90 of a known type, for example, on the order of 20 kilowatt capacity, contained within the cabinet 65 such that upon energization of the generator 90 (FIG. 7) current flow through the tubing circuit 70a–70g induces high level heating in materials located in axial relation to the coils 50. It will be understood that induction generators of other capacities and with higher or lower frequencies could alternatively be used. Such inductance heating has been found to permit substantially instantaneous heating of lead terminal posts 20 and bushings 22 located in operative relation to the coils 50 to temperatures in excess of 1000° F., well above the melting point of lead. For cooling the copper tubing and the generator of heat created by such high-frequency current effects, as is known in the art, cooling water may be circulated through the tubing sections 70a–70g, cooling lines in the generator coupled to the tubing sections, and then through a radiator 91, in this instance mounted on the cabinet 65.

For receiving the terminal posts and cover bushings of a battery to be fused and for conforming melted ends thereof to the proper configuration during energization of the coils 50, each of the induction heating coils 50 removably supports a mold insert 95 in depending fashion from the underside thereof, each of which is formed with a mold cavity 96. The illustrated mold inserts 95 each have a cylindrical shape and are formed with an annular shoulder 98 (FIG. 4) positionable against the underside of the lowermost coil turn 50a, and an annular groove 99 formed in upwardly spaced relation to the shoulder 98 for receiving a flexible retainer washer 100, preferably made of a temperature-resistant elastomer, which enables the mold insert 95 to be captively supported by the lowermost coil turn 50a. The cavity 96 of the mold insert 95 is shaped in substantial conformity to the bushing 22 so as to form an uppermost end of the battery terminal upon melting and fusion of the upper ends of a bushing and terminal post positioned therein. To facilitate seating of a bushing and terminal post into proper position in the mold cavity 96 upon lifting of a battery from the conveyer track 31 by the elevator 51, the lowermost end of the cavity 96 is formed with an outwardly flared chamfer 96a. The upperside of the mold insert 95 preferably is enclosed by a relatively thin walled apertured partition 101 that serves to prevent metal from contacting the coil 50 during the fusion operation, while permitting expanding gases to escape through apertures 102.

The mold insert 95 preferably is made of Teflon which unexpectedly has been found to withstand the relatively high temperatures that occur during the fusion operation and which forms the fused terminals with a relatively smooth clean surface. Such mold inserts 95 have been found to be adaptable for fusing 3000 or more terminals without replacement. It will be appreciated by one skilled in the art, however, that the inserts 95 may be economically produced and are easily replaceable on a regular basis by simply removing the flexible retainer washer 100.

For enhancing quick and reliable heating, melting and fusion of the uppermost ends of the battery terminal posts 20 and cover bushings 22 positioned in the mold cavities, while not adversely effecting the portions of the plastic cover 21 immediately adjacent the bushings, the lowermost turn 50a of each coil surrounds the mold insert 95 at a point about midway down the bushing and terminal post cavity 96 and and the coil turns 50b, 50c are of relatively smaller diameter, corresponding substantially into the diameter of the upper end of the terminal to be fused, and are located in vertically spaced relation above the mold insert 95. Such a coil arrangement has been found to concentrate induction heating effects onto the upper ends of a bushing and terminal post disposed in the mold cavity 96 so as to effect melting and fusion of the ends without significantly affecting the lower parts thereof adjacent that battery cover.

For further intensifying the induction heating affect of the coils 50 onto the terminal post and bushing ends, a current concentrating insert 105 is supported within the two uppermost coil turns 50b, 50c, as shown in FIG.

10. The insert 105 preferably is made of ferrite, or such other metallic material which has the affect of intensifying or concentrating current induced by the coil 50 in the upper ends of the bushing and terminal post located in operative relation thereto. The use of such an induction heating coil 50 and current concentrating insert 105 arrangement has been unexpectedly found to enhance heating of the lead bushing and terminal post parts such that they can be consistently melted to fusion depths of as much as ⅜ of an inch in less than three seconds.

Figure 13:
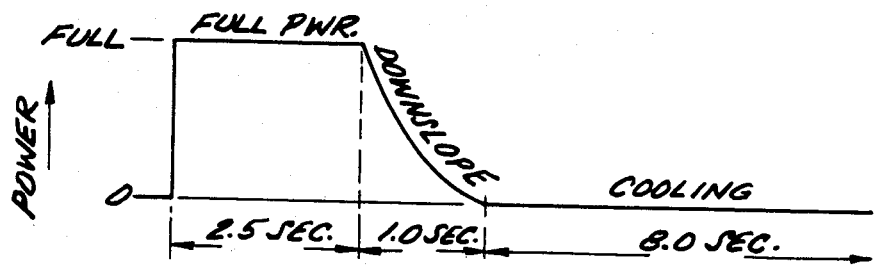
FIG. 13 is a graphic illustration of the heat cycle of the illustrated apparatus.

In accordance with the invention, means are provided for controlling the induction heating cycle such that the coils 50 are instantaneously energized to a predetermined full power level, are maintained at such full power for a predetermined relatively short period to melt the bushing and terminal post ends, and then the power level is gradually decreased in a uniform and controlled manner for fusing the terminals with a relatively smooth surface. In the illustrated embodiment, the power level of the radio-frequency generator 90 is controlled by an SCR power control 110 (FIG. 14) which in turn is activated by a Master Controller 111 adapted to control the various operating functions of the fusion apparatus 30, as will become apparent. Upon positioning of the terminal posts 20 and bushings 22 of a battery into operative relation with the induction heating coils 50, the Master Controller 111 is adapted to energize the SCR power control 110, which energizes the induction heating generator to a full power capacity, as graphically depicted in FIG. 13. After a predetermined period, as timed by the Master Controller 111, the Master Controller will shut off the supply of power to the SCR power control.

Figure 14:
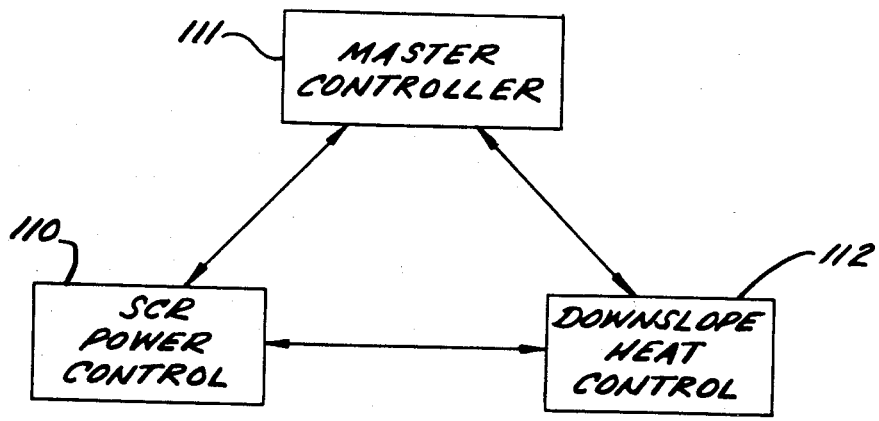
FIG. 14 is a block diagram of the Master Controller of the illustrated apparatus.

In order to provide a controlled power decrease to the induction heating coils from the full power level to a completely de-energized state following the Master Controller 111 shut-off of power to the SCR power control 110, a down-slope heat control circuit 112 is provided, as shown in FIGS. 12 and 14. The down-slope heat control circuit 112 is coupled to the Master Controller 111 by input terminals 114, 115, and a transformer 116 is coupled between the input terminals 114, 115 and a diode bridge 118. A filtering capacitor 119 is coupled across the bridge 118 in a line 120, and a current limiting resistor 121 and a photo diode 122a of a optical coupling device 122 also are coupled across the bridge in a line 124. To activate the SCR power control 110, and thus the induction heating generator 90, the Master Controller 111 will communicate an output voltage (such as 110 V) to the input terminals 114, 115, which is reduced by the transformer 116 to a lower AC voltage, rectified by the diode bridge 118 and filtered by the capacitor 119 to produce a DC current flow through the photo diode 122a. Such current flow through the photo diode 122a activates a photo transistor 122b of the coupling device 122 in an R-C control circuit 128, which in turn allows a reference voltage, as established by potentiometer 126 having a DC power supply 129, to be communicated to output terminals 130, 131 coupling the down-slope control circuit 112 to the SCR power control 110. At the same time, a capacitor 135 coupled in parallel across the potentiometer 126 charges to the reference voltage.

Hence, when the Master Controller 111 communicates a 110 V output between input terminals 115, 116 of the down-slope heat control circuit 112, the full reference voltage, as established by the potentiometer 126, is communicated to the SCR power control 110 to nearly instantaneously energize the high-frequency generator 90 to its full power capacity. Following the predetermined period of full power energization of the generator 90, as timed by the Master Controller 111, the Master Controller de-energizes the input terminals 115, 116 of the down slope heat control circuit 112, which turns off the photo diode 122a and photo transistor 122b of the optical coupling device 122. Notwithstanding such de-energization of the input terminals 115, 116 and the photo coupling device 122, the voltage across the capacitor 135 in the R-C control circuit 128 continues to feed the output terminals 130, 131, but decays over a determined period, such as about one second, so that the voltage to the output terminals 130, 131, and the resulting power level of the generator controlled by the SCR power control 110, proportionally decreases in a controlled manner to zero.

It will be appreciated, therefore, that the period of full power operation of the induction heating generator 90 may be selectively effected by the Master Controller 111, while the controlled de-energization of the generator 90 may be controlled by the design of the down-slope heat control circuit 112. In practice, it has been found that melting of the ends of battery terminal posts 20 and cover bushings 22 sufficient to achieve relatively constant and reliable fusion depths of between ¼ and ⅜ inch can be achieved when the generator is operated at a full power level for about 2.5 seconds, and that unexpected good surface appearance of the fused terminals is achieved by de-energizing the induction heating coils 50 from full power to zero power in the foregoing controlled fashion over a period of about one second. The terminals preferably are thereafter allowed to cool for a period of about eight seconds following complete de-energization of the inductance heating coils prior to removal from the mold inserts 95. As a result, the entire fusion operation, including raising and lowering of the battery into the inductance heating coils 50, can be carried out by the apparatus of the present invention well within a period of about 20 seconds. It will be understood by one skilled in the art that by virtue of such short process time, the apparatus 30 lends itself to efficient utilization in an automated battery production line where the individual processing operations are limited to short intervals. It will be appreciated that while the illustrated down-slope heat control circuit 112 provides a relatively constant decrease from full power to complete de-energization of the induction heating coils, alternatively means could be provided for effecting a plurality of discreet relatively small voltage drops in the reference voltage to the SCR power control 110.

The Master Controller 111, which can be a conventional microprocessor-based programmable controller such as a Gould Modicon 84 Programmable Controller, can be programmed to effect the sequential operation of the terminal fusion apparatus 30 of the present invention and coordinate such operation with the transfer of batteries along the conveyor track 31. As is known in the art, the Master Controller 111 can communicate with the apparatus 30 through conventional input and output modules which convert incoming signals from the various sensing devices of the apparatus to signal levels compatible with the controller and which convert output signals of the controller to signal levels compatible with the apparatus. Hence, when a battery is transferred from the fusion ready station 40 to the fusion apparatus 30 and strikes a raised stop 38, appropriate sensing means may provide a signal to the Master Controller 111, in response to which the cylinder 41 is actuated to extend its rod 41a and position the battery against the side-reference rail 34, which is sensed by the photo cell 42. In response thereto, the cylinder 41 is reverse actuated to withdraw the rod 41a, and the cylinder 55 actuated to raise the battery so that the terminal posts 20 and cover bushings 22 are disposed in operative relation to the respective induction heating coils 50, such raised position being sensed by the magnetic switch 60 on the cylinder 55. The Master Controller 111 may then energize the SCR power control 110 through the down-slope heat control circuit 112 to energize the generator 90 to full power level, maintain such full power level for a predetermined period of time to effect melting of the ends of the terminal post and bushings, and following such predetermined full power heating period, the Master Controller 111 will shut off the input voltage to the down-slope heat control circuit 112, which thereafter provides a controlled de-energization of the generator 90 and induction heating coils 50. Following a subsequent predetermined cooling period, the Master Controller 111 will cause the reverse actuation of air cylinder 55, lowering the elevator 51 and repositioning the battery on the conveyer track 31, as sensed by the switch 61, for transfer to the succeeding operating station, the entire cycle of operation being effected in a predetermined relatively short period of time.

It will be further appreciated that the fusion apparatus 30 of the present invention is adaptable for processing various different sized batteries. To this end, the T-buss 68 may be readily removed from the dropper buss 69 by removal of the mounting bolts 78 and replaced with a T-buss configuration to accommodate different terminal spacing and location on the battery. The lifting stroke of the elevator 51 also may be selectively adjusted by adjustment of the stops 58. In addition, to further facilitate setup of the apparatus 30 for different sized batteries, the cabinet 65 in this case is mounted on an X-Y table 140 (FIGS. 6 and 7) comprising an upper platform 141 upon which the cabinet 65 is mounted for movement parallel to the track 31 through actuation of a ball screw 142, and a lower platform 144, upon which the cabinet 65 and upper platform 141 are mounted for movement transverse to the track 31 by actuation of a ball screw 145. A gauge 146 is provided to facilitate location of a cabinet in the predetermined longitudinal position for a particular battery size, and a gauge 148 similarly is provided to facilitate transverse location of the cabinet.

What is claimed is:

1. An apparatus for fusing the end of a lead battery cell terminal post to the end of a hollow lead bushing fixed in the cover of a battery being assembled and within which the terminal post is concentrically disposed comprising
   an induction heating coil;
   means supporting said induction heating coil;
   means supporting a battery being assembled such that a terminal post and bushing thereof are in concentric operative relation to said induction heating coil;
   means for generating a high-frequency oscillating current in said coil to induce current flow in a terminal post and bushing in operative relation to said coil; and
   means for energizing said high-frequency current generating means to a predetermined first power level, maintaining said power level for a first predetermined period for melting the ends of said terminal post and bushing by induced current flow therein, and then continuously decreasing said power level to zero in a controlled manner for a second predetermined period of time to effect the fusion of the ends of the terminal post and bushing to a controlled depth said second predetermined period being shorter than said first predetermined period.

2. The apparatus of claim 1 including control means for effecting substantially instantaneous energization of said current generating means to said first power level.

3. The apparatus of claim 2 in which said control means includes a control circuit having capacitive means, means for selectively communicating an input voltage to said control circuit for charging said capacitive means to a predetermined reference voltage and for effecting substantially instantaneous energization of said current generating means to said first power level, and means for terminating said input voltage to said control circuit after said first predetermined period for deenergizing said current generating means proportionately to the voltage decay of said control circuit capacitive means.

4. The apparatus of claim 2 in which said control means includes a programmable controller, power control means communicating with said current generating means, and down-slope heat control circuit means communicating between said programmable controller and said power control means; said programmable controller being operable to selectively produce an output voltage to energize said power control means through said down-slope heat control circuit means to effect substantially instantaneous energization of said current generating means to said first power level and maintain said first power level for said first predetermined period; and said down-slope heat control circuit means being operable to gradually control deenergization of said current generating means upon termination of said programmable controller output voltage after said first predetermined period.

5. The apparatus of claim 4 in which said down-slope heat control circuit means includes capacitive means which charges to a predetermined reference voltage upon communication of said programmable controller output voltage to said power control means and which provides a controlled gradually decreasing voltage output to said power control means proportionate to the voltage decay of said capacitive means upon terminating of said programmable controller output voltage after said first predetermined period.

6. The apparatus of claim 1 in which said energizing means decreases said power level in a substantially uniform manner for a period of time equal to about half the period said energizing means maintains said full power level.

7. A method for fusing the end of a lead battery cell terminal post to the end of a hollow lead bushing fixed in the case of a battery being assembled and within which the terminal post is concentrically disposed comprising
   supporting an induction heating coil;
   supporting said battery being assembled such that a terminal post and bushing thereof are in concentric operative relation to said induction heating coil; and
   energizing said coil to a first predetermined power level for generating a high-frequency oscillating current in said coil to induce current flow in a terminal post and bushing in operative relation to said coil, maintaining said power level for a first predetermined period for melting the ends of said terminal post and bushing by said induced current flow, and then continuously decreasing said power level to zero in a controlled manner for a second predetermined period of time to effect the fusion of the ends of the terminal post and bushing to a controlled depth said second predetermined period being shorter than said first predetermined period.

8. The method of claim 7 including substantially instantaneously energizing on said coil to said first power level.

9. The method of claim 8 including energizing said coil to said first power level while simultaneously charging a capacitive means to a predetermined reference voltage, and decreasing said power level to said current generating means proportionate to the voltage decay of said capacitive means following deenergization thereof.

10. The method of claim 7 including simultaneously forming the ends of said terminal post and bushing into final fused form as they are heated and melted.

11. The method of claim 7 including decreasing said power level in a uniform manner for a period of time equal to about one-half the period said first power level is maintained.

12. The method of claim 7 including maintaining said first power level for a period of between two and three seconds, and gradually decreasing said power level from said first predetermined level to a completely deenergized state over a period of about one second.

* * * * *